US008605665B2

(12) United States Patent
Kang et al.

(10) Patent No.: US 8,605,665 B2
(45) Date of Patent: Dec. 10, 2013

(54) APPARATUS AND METHOD FOR TRANSMISSION TIME INTERVAL RECONFIGURATION IN A MOBILE COMMUNICATION SYSTEM

(75) Inventors: Hwan-Min Kang, Suwon-si (KR); Hun-Kee Kim, Seoul (KR); Young-Ik Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 364 days.

(21) Appl. No.: 12/679,205

(22) PCT Filed: Sep. 18, 2008

(86) PCT No.: PCT/KR2008/005509
§ 371 (c)(1),
(2), (4) Date: Mar. 19, 2010

(87) PCT Pub. No.: WO2009/038356
PCT Pub. Date: Mar. 26, 2009

(65) Prior Publication Data
US 2010/0254275 A1    Oct. 7, 2010

(30) Foreign Application Priority Data
Sep. 21, 2007    (KR) .................. 10-2007-0096285

(51) Int. Cl.
*H04W 4/00*    (2009.01)
(52) U.S. Cl.
USPC ...................................... 370/329

(58) Field of Classification Search
USPC .............. 370/329, 318, 338; 455/522, 69
See application file for complete search history.

(56) References Cited

U.S. PATENT DOCUMENTS

| 7,054,633 | B2 * | 5/2006 | Seo et al. .................. 455/439 |
| 7,515,579 | B2 * | 4/2009 | Cheng et al. .............. 370/345 |
| 7,599,707 | B2 * | 10/2009 | Zhang et al. .............. 455/522 |
| 7,822,044 | B2 * | 10/2010 | Lee et al. .................. 370/400 |

FOREIGN PATENT DOCUMENTS

| JP | 2006-345501 | 12/2006 |
| KR | 10-2005-0106350 | 11/2005 |
| WO | WO2006-038066 A2 | 4/2006 |
| WO | WO2006-038078 A2 | 4/2006 |

* cited by examiner

*Primary Examiner* — Chandrahas Patel
(74) *Attorney, Agent, or Firm* — The Farrell Law Firm, P.C.

(57) ABSTRACT

An apparatus and method for Transmission Time Interval (TTI) reconfiguration in a mobile communication system are provided. The apparatus includes an ACK/NACK determiner, an ACK/NACK controller, and a TTI controller. The ACK/NACK determiner determines if a response signal to be transmitted is ACKnowledgment (ACK) or Non ACKnowledgment (NACK) depending on an error or non-error of data received from a User Equipment (UE). The ACK/NACK controller counts the ACK and NACK determined in the ACK/NACK determiner. The TTI controller identifies if number of the latest ACKs counted in the ACK/NACK controller is continuously generated by preset number of times and, if it is continuously generated by the present number of times, reconfigures a new TTI.

17 Claims, 6 Drawing Sheets

(A)

(B)

(A)

(B)

APPARATUS AND METHOD FOR TRANSMISSION TIME INTERVAL RECONFIGURATION IN A MOBILE COMMUNICATION SYSTEM

TECHNICAL FIELD

The present invention relates to an apparatus and method for Transmission Time Interval (TTI) reconfiguration in a mobile communication system. More particularly, the present invention relates to an apparatus and method for, upon change of a TTI, reducing a loss of data while performing Hybrid Automatic Repeat reQuest (HARQ) retransmission in a system having two or more TTIs such as a High-Speed Uplink Packet Access (HSUPA) system.

BACKGROUND ART

Recent wireless mobile communication systems are in the trend of demand for a high-speed packet service. Thus, a high-speed packet is being standardized for an uplink as well as a downlink even in an existing Wideband Code Division Multiple Access (WCDMA) system. High-Speed Uplink Packet Access (HSUPA) system uses an Enhanced Dedicated CHannel (E-DCH) added to an uplink of a WCDMA system, as a channel for high-speed packet. The HSUPA system can perform high-speed data transmission at high reliability because supporting an uplink Hybrid Automatic Repeat reQuest (HARQ). A HARQ scheme used is an N-channel Stop And Wait HARQ (N-channel SAW HARQ).

The N-channel SAW HARQ is described in detail below. The N-channel SAW HARQ is a scheme newly introducing two schemes below to enhance the efficiency of a general SAW ARQ scheme.

The first scheme is a scheme in which a reception side temporarily stores erroneous data and combines the erroneous data with a retransmission of corresponding data, thus reducing a probability of error occurrence. To temporarily store erroneous data and combines the erroneous data with a retransmission is called "soft combining". The soft combining is divided into Chase Combining (CC) and Incremental Redundancy (IR) techniques.

In the CC technique, a transmission side uses the same transport format for initial transmission and retransmission. If symbols of 'm' number are transmitted as one coded block during initial transmission, symbols of the same 'm' number are transmitted during retransmission as well. That is, the initial transmission and retransmission apply the same coding rate. A reception side combines an initially transmitted data block with a retransmitted data block, performs Cyclic Redundancy Code (CRC) operation using the combined data block, and identifies whether an error occurs.

In the IR technique, a transmission side uses a different transport format for initial transmission and retransmission. If user data of 'n' bits are converted into symbols of 'm' number through channel coding, the transmission side transmits only part of the symbols of the 'm' number during initial transmission, and sequentially transmits remaining parts, which have not been transmitted during initial transmission, during retransmission. That is, the initial transmission and retransmission have a different coding rate. A reception side configures a data block having a high coding rate by attaching a retransmitted data block to the rear of an initially transmitted data block and then, executes error correction. In the IR technique, the initially transmitted data block and retransmitted data block are distinguished using a version number. Initial transmission is named as 'Version 1', next retransmission is named as 'Version 2', and further next retransmission is named as 'Version 3'. The reception side can correctly combine an initially transmitted data block with a retransmitted data block using version information.

The second scheme, newly introduced into the N-channel SAW HARQ to enhance the general SAW ARQ scheme, is described below. The general SAW ARQ scheme cannot transmit a next packet until receiving ACKnowledgment (ACK) of a previous packet. Unlike this, the N-channel SAW HARQ continuously transmits a plurality of packets with not receiving ACK, thus being capable of enhancing the efficiency of use of a radio link. If the N-channel SAW HARQ sets logical channels of 'N' number between a User Equipment (UE) and a NodeB, and a reception side identifies the logical channels by a specific time or explicit channel number, the reception side can be aware if a packet received at any time point belongs to any channel, and can independently perform HARQ process of reconfiguring packets in sequence having to be received or processing a corresponding packet by soft combining.

An uplink HARQ process is described below. In a HSUPA system, an E-DCH channel supports a 10 msec TTI and a 2 msec TTI. Number of HARQ processes for the 10 msec TTI is equal to 4, and number of HARQ processes for the 2 msec TTI is equal to 8. The number of HARQ processes is decided depending on a round trip delay time between a UE and a Node B.

FIG. 1 is a diagram illustrating a HARQ process for each TTI in an E-DCH channel of a HSUPA system according to the conventional art. FIG. 1(A) is a diagram illustrating a HARQ process for a 10 msec TTI. FIG. 1(B) is a diagram illustrating a HARQ process for a 2 msec TTI.

Referring to FIG. 1(A), a UE transmits (120) data received from an upper layer, to a Node B over an E-DCH channel in a process 1 (100). The Node B decodes the received data, performs a Cyclic Redundancy Code (CRC) check to determine if the data is normal data or abnormal data, and transmits (121) an ACK signal for normal data or a Non ACKnowledgment (NACK) signal for abnormal data to the UE over an E-DCH HARQ acknowledgment Indicator CHannel (E-HICH). Upon receiving the ACK signal, the UE transmits new data to the Node B. Upon receiving the NACK signal, the UE retransmits data having been transmitted in the previous process 1 (100), in a next process 1 (104). Such retransmission is repeated till an ACK signal is forwarded, or is repeated by the maximum number of times of retransmission. The aforementioned operation is identically applied to a process 2 (101), a process 3 (102), and a process 4 (103) for a 10 msec TTI. FIG. 1(B) shows the same operation as that of FIG. 1(A), but eight HARQ processes operate sequentially.

Unlike a High-Speed Downlink Packet Access (HSDPA) system supporting only a short 2 msec TTI, a HSUPA system is specified in the 3rd Generation Partnership Project (3GPP) Release 7 standard to simultaneously support both a 10 msec TTI and a 2 msec TTI depending on UE's capacity. Also, a High-Speed Dedicated CHannel (HS-DCH) of the HSDPA system supports a hard handoff, while an E-DCH of the HSUPA system supports a soft handover.

As described above, an E-DCH for high-speed data transmission supports both a 10 msec TTI and a 2 msec TTI in a HSUPA system. The HSUPA system uses a 2 msec TTI to increase a transmission speed and reduce a delay time. Depending on a communication environment and a system environment, a 10 msec TTI is used and then reconfigured as a 2 msec TTI, or a 2 msec TTI is used and then reconfigured as a 10 msec TTI. If TTI reconfiguration is performed with a HARQ process not fully terminated, data remaining in a buffer is deleted and is not transmitted. Such packet data can be restored through ARQ at RLC level, but this deteriorates the efficiency of HARQ.

In order to solve the problem, the conventional art discloses that, if a command of TTI reconfiguration is issued, moment wait is done and then, TTI reconfiguration is performed after a previous HARQ process is all terminated. However, the conventional art has a disadvantage that, when a command of TTI reconfiguration is issued from a NodeB, it takes a long delay time until a HARQ process is terminated. Also, the conventional art has a problem that a delay of a change of TTI may lead to a call-drop phenomenon, because there is a strong possibility of changing a 2 msec TTI into a 10 msec TTI when a channel environment is bad or a signal intensity is weak.

DISCLOSURE OF INVENTION

Technical Solution

An aspect of the present invention is to at least the above-mentioned problems and/or disadvantages and to provide at least the advantages described below. Accordingly, one aspect of the present invention is to provide an apparatus and method for Transmission Time Interval (TTI) reconfiguration in a mobile communication system.

Another aspect of the present invention is to provide an apparatus and method for, upon change of a TTI, reducing a loss of data while performing Hybrid Automatic Repeat reQuest (HARQ) retransmission in a system having two or more TTIs.

A further aspect of the present invention is to provide an apparatus and method for performing TTI reconfiguration and reducing a loss of data when continuous ACKnowledgment (ACK) is generated by preset number of times in a Node B of a mobile communication system.

A still further another aspect of the present invention is to provide an apparatus and method for TTI reconfiguration, for, when a frequency of generation of Non ACKnowledgment (NACK) is high at the time of TTI reconfiguration, requesting a User Equipment (UE) for power boosting and reducing the frequency of generation of NACK in a Node B of a mobile communication system.

The above aspects are achieved by providing an apparatus and method for TTI reconfiguration in a mobile communication system.

According to one aspect of the present invention, a Node B for Transmission Time Interval (TTI) reconfiguration in a mobile communication system is provided. The Node B includes an ACK/NACK determiner, an ACK/NACK controller, and a TTI controller. The ACK/NACK determiner determines if a response signal to be transmitted is ACKnowledgment (ACK) or Non ACKnowledgment (NACK) depending on an error or non-error of data received from a User Equipment (UE). The ACK/NACK controller counts the ACK and NACK determined in the ACK/NACK determiner. If detecting occurrence of a TTI reconfiguration event, the TTI controller identifies if number of the latest ACKs counted in the ACK/NACK controller is continuously generated by preset number of times and, if it is continuously generated by the preset number of times, reconfigures a new TTI.

According to another aspect of the present invention, a User Equipment (UE) for Transmission Time Interval (TTI) reconfiguration in a mobile communication system is provided. The UE includes a power controller and a gain controller. If receiving a power boosting message, the power controller identifies boosting cycle information comprised in the power boosting message, and provides the identified cycle information to the gain controller. The gain controller increases, by power boosting, a gain of output data during the boosting cycle received from the power controller.

According to a further another aspect of the present invention, a method for Transmission Time Interval (TTI) reconfiguration in a Node B of a mobile communication system is provided. The method includes determining if a response signal to be transmitted is ACKnowledgment (ACK) or Non ACKnowledgment (NACK) depending on an error or non-error of data received from a User Equipment (UE), counting the determined ACK and NACK, if detecting occurrence of a TTI reconfiguration event, identifying if number of the latest ACKs counted is continuously generated by preset number of times, and if the number of the latest ACKs is continuously generated by the preset number of times, reconfiguring a new TTI.

According to a yet another aspect of the present invention, a method for Transmission Time Interval (TTI) reconfiguration in a User Equipment (UE) of a mobile communication system is provided. The method includes identifying boosting cycle information comprised in the power boosting message upon receiving a power boosting message, and increasing, by power boosting, a gain of output data during the boosting cycle.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following description taken in conjunction with the accompanying drawings in which.

Throughout the drawings, it should be noted that like reference numbers are used to depict the same or similar elements, features and structures.

BEST MODE FOR CARRYING OUT THE IVENTION

Preferred embodiments of the present invention will be described herein below with reference to the accompanying drawings. In the following description, well-known functions or constructions are not described in detail since they would obscure the invention in unnecessary detail.

A description of an apparatus and method for Transmission Time Interval (TTI) reconfiguration, for reconfiguring a TTI and reducing a loss of data when ACKs (ACKnowledgments) of preset number of times are generated in a Node B of a system having two or more TTIs is made below with reference to the accompanying drawings.

Figure 1:
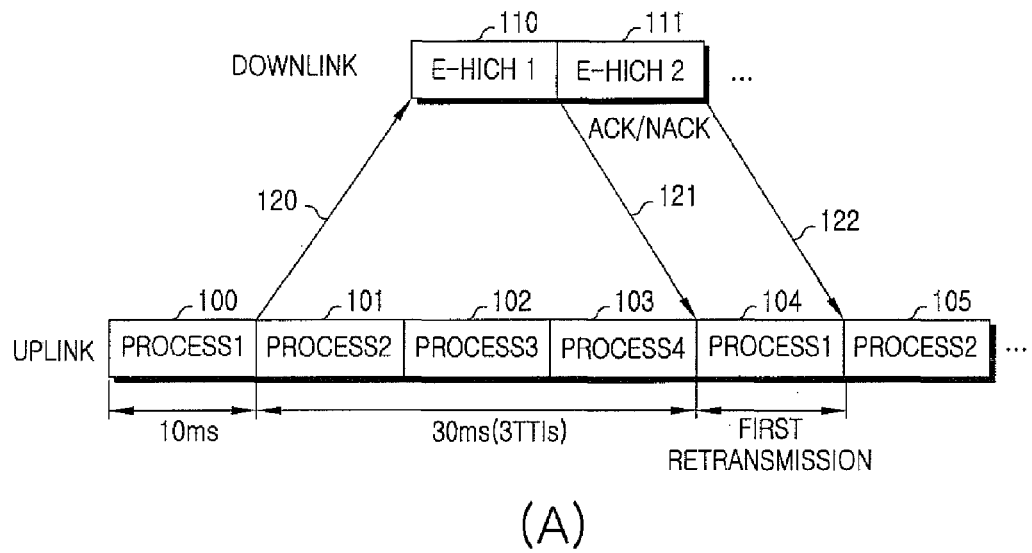
FIG. 1 is a diagram illustrating a Hybrid Automatic Repeat reQuest (HARQ) process for Transmission Time Interval (TTI) in an Enhanced Dedicated CHannel (E-DCH) of High-Speed Uplink Packet Access (HSUPA) system according to the conventional art.
Figure 1:
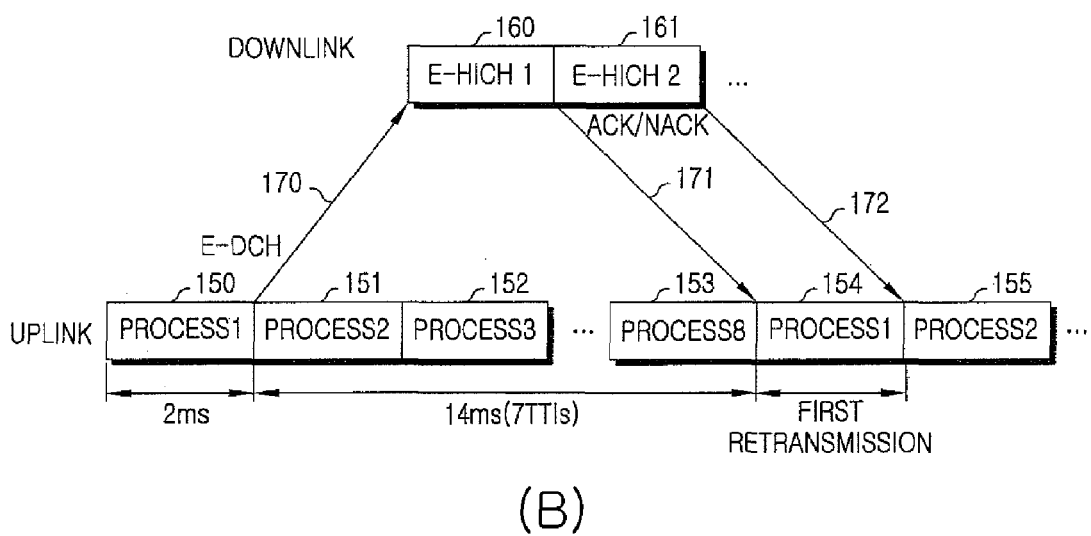
Figure 2:
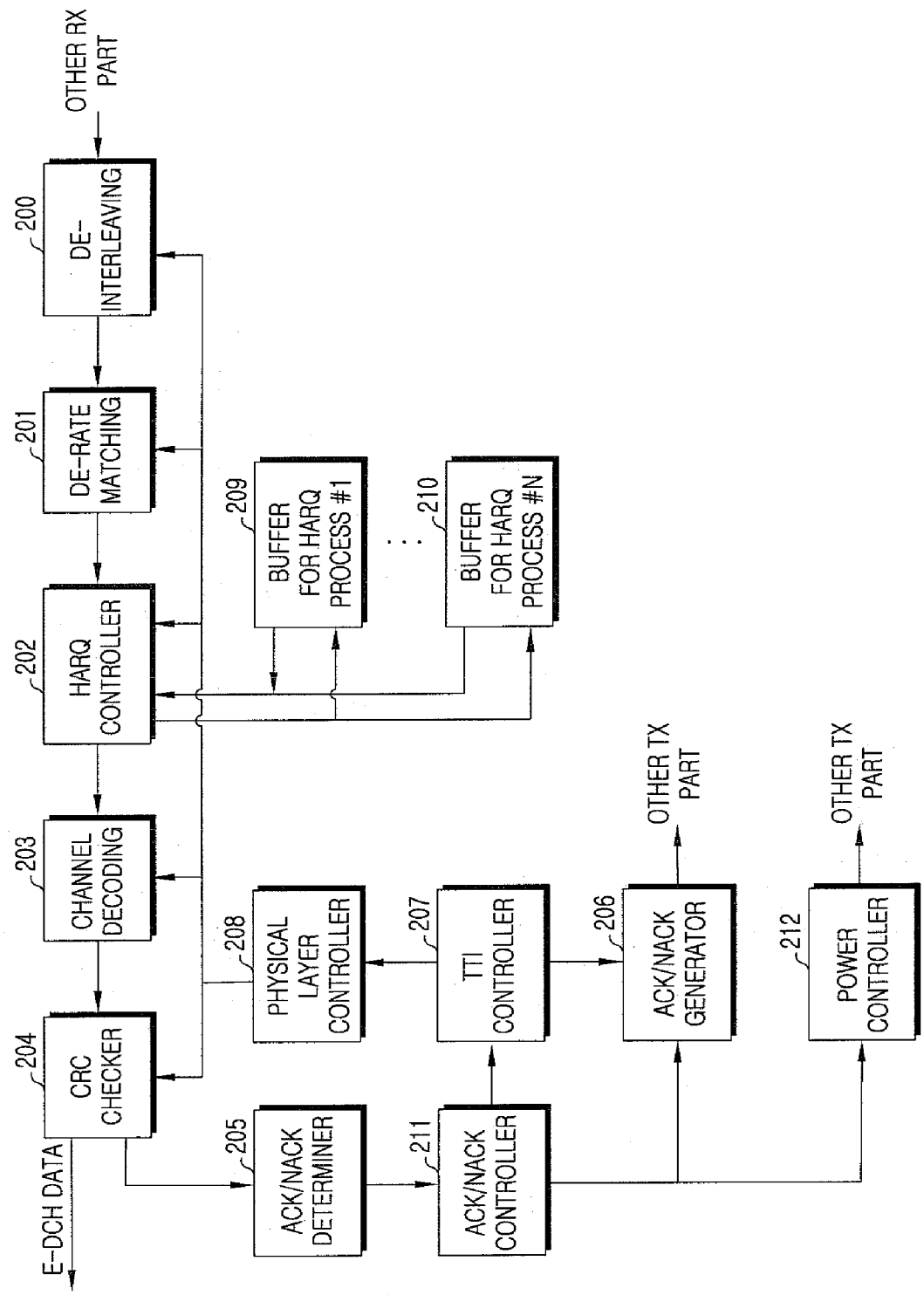
FIG. 2 is a block diagram illustrating a construction of a Node B for TTI reconfiguration in a mobile communication system according to an exemplary embodiment of the present invention.

FIG. 2 is a block diagram illustrating a construction of a Node B for TTI reconfiguration in a mobile communication system according to an exemplary embodiment of the present invention. In FIG. 2, a basic modulation and demodulation device is omitted because it has the same construction as that of an existing Node B, and only a partial construction necessary for describing the present invention is shown. In FIG. 2, a de-interleaving 200, a de-rate matching 201, a channel decoding 203, and a Cyclic Redundancy Code (CRC) checker 204 are a decoding chain for packet data reception.

The decoding chain de-interleaves interleaved data received through the de-interleaving 200, de-rate matches data matched to a data rate by repetition or puncturing through the de-rate matching 201, performs channel decoding by a corresponding coding rate through the channel decoding 203, and performs a CRC check through the CRC checker 204.

An ACK/NACK determiner 205 determines normal reception or error occurrence through CRC check after decoding. An ACK/NACK generator 206 generates ACK or NACK on the basis of the ACK/NACK determination result of the ACK/NACK determiner 205 and transmits the ACK or NACK to a User Equipment (UE).

The ACK/NACK determiner 205 provides the ACK/NACK determination result to an ACK/NACK controller 211. The ACK/NACK controller 211 counts number of ACKs/NACKs depending on the received ACK/NACK determination result and transmits the count result to a TTI controller 207 and a power controller 212.

If detecting the occurrence of a TTI reconfiguration event, the TTI controller 207 identifies if number of ACKs received from the ACK/NACK controller 211 continuously generated is as many as the preset number of times and, if the number of ACKs continuously generated is as many as the preset number of times, forwards new TTI information to a physical layer controller 208 and the ACK/NACK generator 206 according to a change time point. A more detailed description is made below with reference to FIG. 4.

The power controller 212 determines number of NACKs and, if the number of NACKs is generated more than constant number of times during a preset interval, sends a power boosting message to a UE through Tx message sending.

A Hybrid Automatic Repeat reQuest (HARQ) controller 202 is to implement HARQ process. The HARQ controller 202 stores erroneous data and subsequent normal data in HARQ process buffers 209 and 210 during a constant time and combines the erroneous data with a retransmission of corresponding data, thus reducing a probability of error occurrence.

Each block of the coding chain all receives control information through the physical layer controller 208. When a TTI is changed, the TTI controller 207 forwards the changed TTI to the physical layer controller 208 because even a process time unit is changed.

Figure 3:
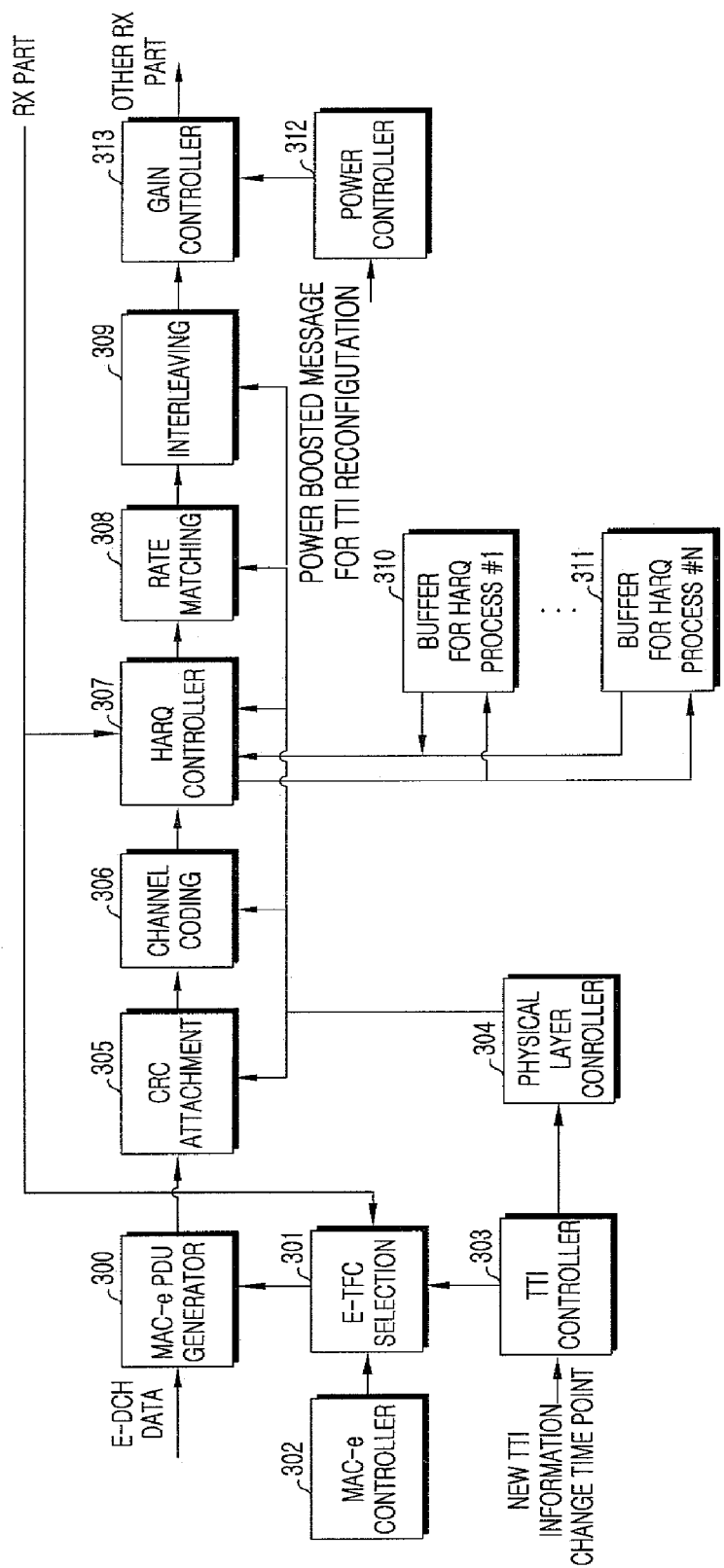
FIG. 3 is a block diagram illustrating a construction of a User Equipment (UE) for TTI reconfiguration in a mobile communication system according to an exemplary embodiment of the present invention.

FIG. 3 is a block diagram illustrating a construction of a UE for TTI reconfiguration in a mobile communication system according to an exemplary embodiment of the present invention. Referring to FIG. 3, CRC attachment 305, channel coding 306, rate matching 308, and interleaving 309 blocks are a coding chain for actually processing data. MAC-e means an entity for taking charge of processing an Enhanced-Dedicated CHannel (E-DCH) in a MAC layer. If receiving E-DCH data from an upper layer, the MAC-e determines a data rate through Enhanced Transport Format Combination (E-TFC) selection. An E-TFC selection 301 receives the maximum transmissible data rate information from the MAC-e controller 302 and receives TTI information from a TTI controller 303, thus selecting E-TFC. If being given TTI reconstruction time point and new TTI information, the TTI controller 303 provides changed TTI information to the E-TFC selection 301 and a physical layer controller 304 at a corresponding change time point.

If E-TFC of data is selected, a MAC-e Protocol Data Unit (PDU) generator 300 generates a MAC-e PDU, the CRC attachment 305 attaches a CRC to the generated MAC-e PDU, the channel coding 306 performs channel-coding at a corresponding coding rate to achieve robustness against a radio channel, the rate matching 308 matches a data rate, and the interleaving 309 performs interleaving to achieve robustness against a burst error and forwards the interleaving result to a modulator/de-modulator (not shown).

A HARQ controller 307 is to implement HARQ process. The HARQ controller 307 stores data not generating an ACK/NACK response within the maximum number of times of retransmission, in HARQ process buffers 310 and 311, respectively and, if receiving ACK, empties the HARQ process buffers 310 and 311 and, if receiving NACK, performs retransmission using the data stored in the HARQ process buffers 310 and 311.

Each block of the coding chain all receives control information through the physical layer controller 304. When a TTI is changed, the TTI controller 303 forwards the changed TTI to the physical layer controller 304 because even a process time unit is changed.

If receiving a power boosting message for reducing an error rate upon TTI reconfiguration from a Node B, the power controller 312 identifies information on a boosting cycle that is a high power output period included in the power boosting message and provides the boosting cycle information to a gain controller 313. The gain controller 313 increases a gain of output data outputted during a boosting time received from the power controller 312.

The boosting cycle included in the power boosting message is a cycle for arbitrarily performing boosting during a specific time for TTI change and includes a start time point and cycle information expressed by Connection Frame Number (CFN).

Figure 4:
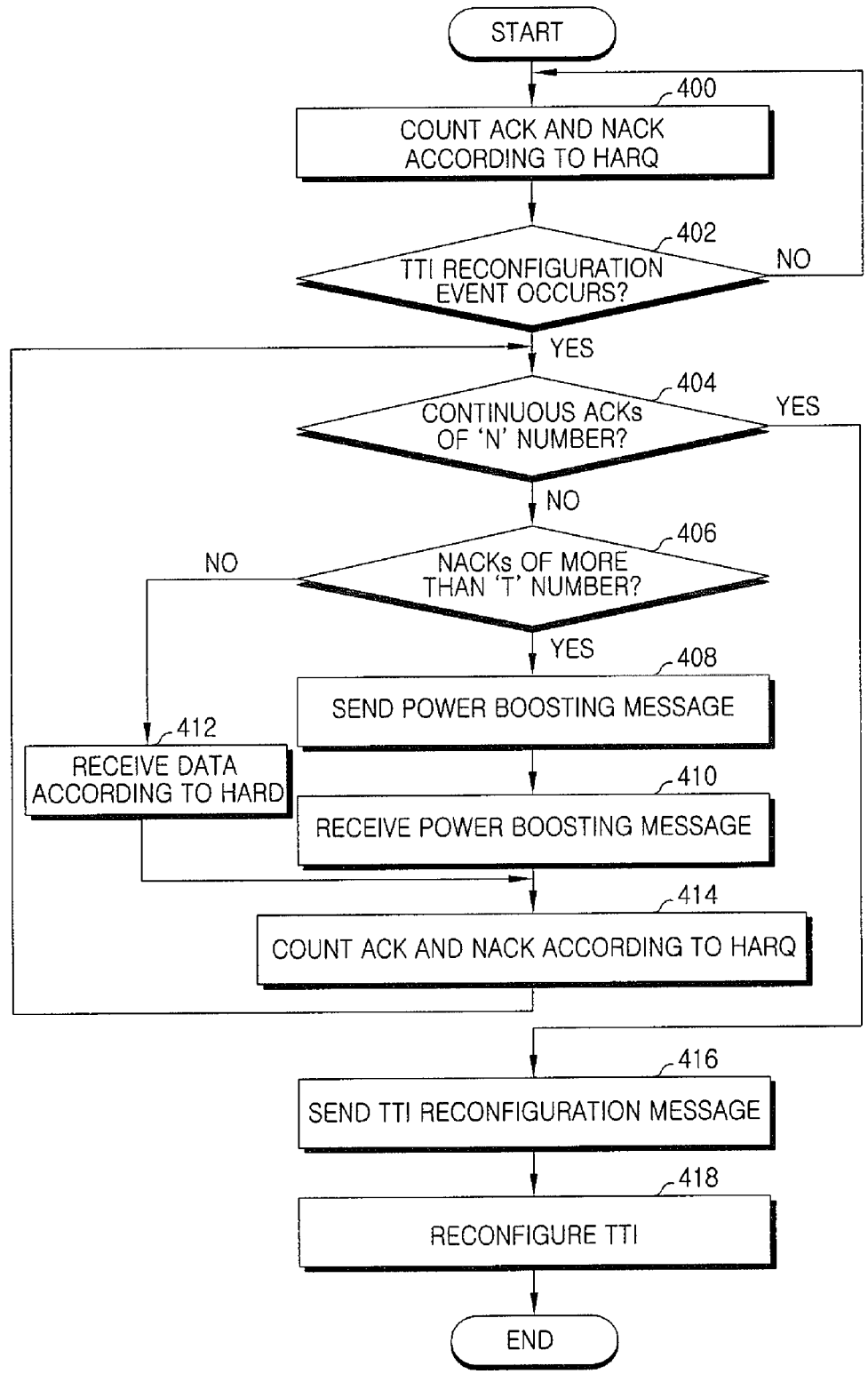
FIG. 4 is a flow diagram illustrating a process of TTI reconfiguration in a Node B according to an exemplary embodiment of the present invention.

A method for TTI reconfiguration in a mobile communication system according to an exemplary embodiment of the present invention is described below with reference to the drawings. FIG. 4 is a flow diagram illustrating a process of TTI reconfiguration in a Node B according to an exemplary embodiment of the present invention.

Referring to FIG. 4, upon receiving data, the Node B counts ACK and NACK according to HARQ in step 400, and identifies if a TTI reconfiguration event occurs in step 402. If the occurrence of the TTI reconfiguration event is not detected, the Node B returns to step 400 and keeps counting ACK and NACK.

If the occurrence of the TTI reconfiguration event is detected, in step 404, the Node B identifies if continuous ACKs are generated as many as the latest preset number (N) of times.

If continuous ACKs of 'N' number are not generated, in step 406, the Node B identifies if NACKs of more than preset number (T) of times are generated during a preset interval (i.e., an interval for receiving data of 'N' number). If NACKs of more than the 'T' number are generated, the Node B sends a power boosting message to a UE in step 408, receives data having a high gain by performing power boosting for the UE in step 410, if so, counts ACK and NACK according to HARQ in step 414, and returns to step 404.

If NACKs of less than the 'T' number are generated in step 406, the Node B receives data according to HARQ from a UE in step 412, counts ACK and NACK according to HARQ in step 414, and returns to step 404.

If continuous ACKs of 'N' number are generated in step 404, the Node B sends a TTI reconfiguration message to a UE in step 416 and reconfigures a TTI in step 418.

A probability of generating 'N' number of ACKs in step 404 is described in brief as follows. For example, when assuming that a BLock Error Rate (BLER) is equal to 10e−2, a probability of generation of ACK is equal to about 0.99 (=1−0.01) and a probability of generation of continuous ACKs of 'N' number is expressed by $0.99^N$. Thus, it can be appreciated that, at 2 msec of HSUPA, ACKs are relatively much generated because a probability of generation of eight continuous ACKs is equal to about 0.922 (=$0.99^8$) and ACKs can be generated 92% or so. Although BLER is equal to 10e−1 in the worst case, ACKs are generated 43% or so.

Figure 5:
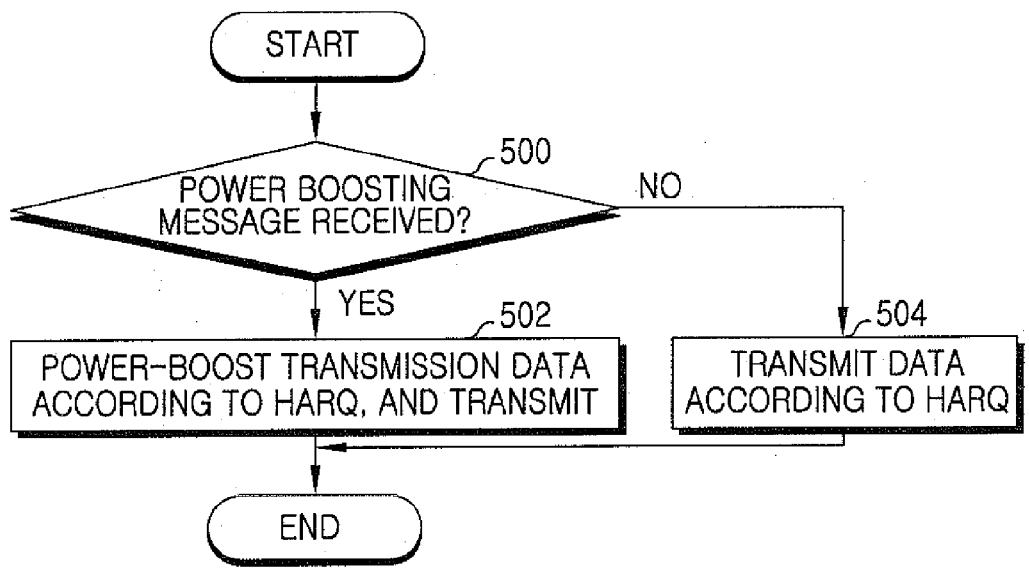
FIG. 5 is a flow diagram illustrating a process of reducing an error rate for TTI reconfiguration in a UE according to an exemplary embodiment of the present invention.

FIG. 5 is a flow diagram illustrating a process of controlling power and reducing an error rate for TTI reconfiguration in a UE according to an exemplary embodiment of the present invention. Referring to FIG. 5, in step 500, the UE identifies if it receives a power boosting message for reducing an error rate upon TTI reconfiguration from a Node B.

If receiving the power boosting message, in step 502, the UE power-boosts transmission data according to HARQ during a boosting cycle that is a high power output period included in the power boosting message, and transmits the data to a Node B.

If not receiving the power boosting message, in step 504, the UE transmits data according to HARQ to the Node B with no power boosting.

If receiving a TTI reconfiguration message from the Node B in course of power boosting and data transmission of step 502, the UE terminates power boosting.

Figure 6:
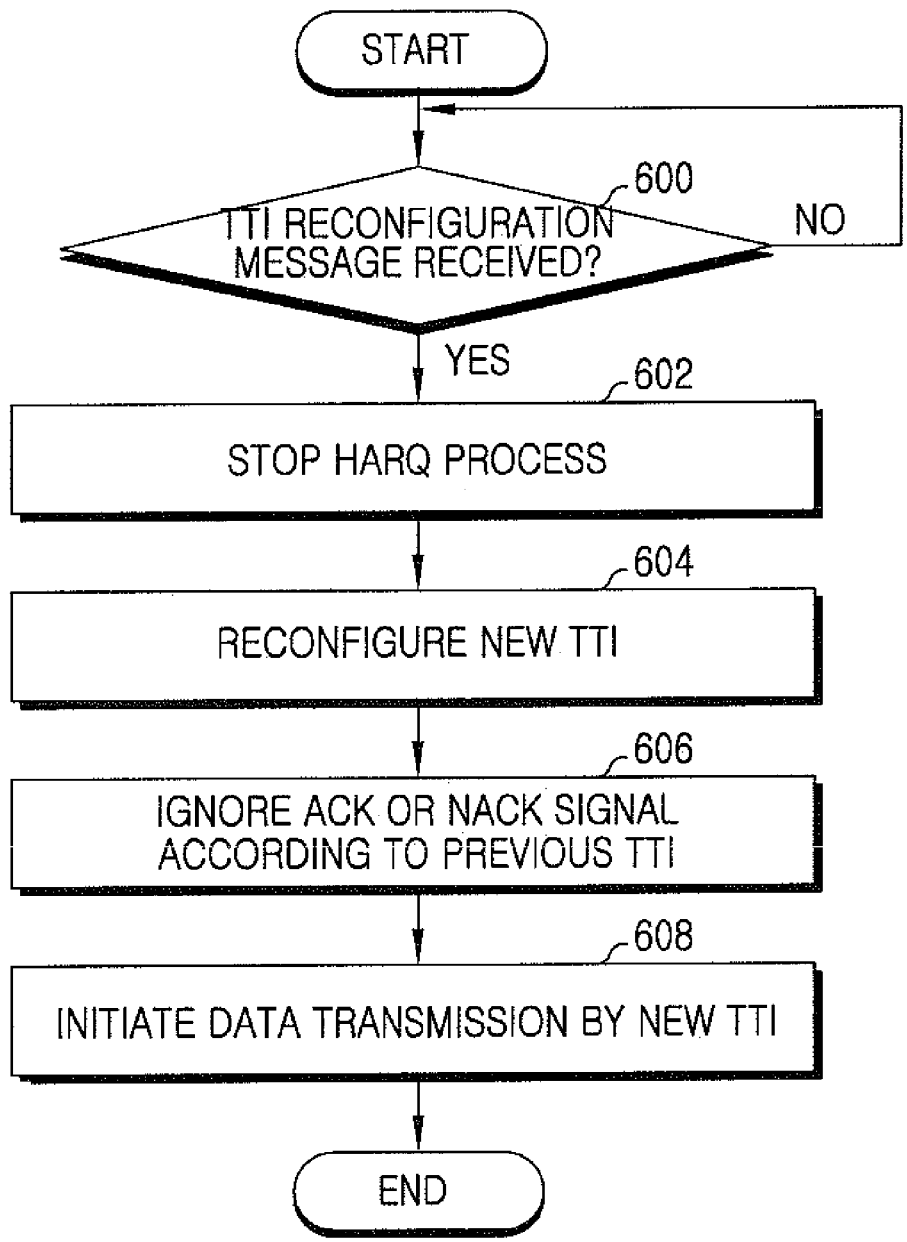
FIG. 6 is a flow diagram illustrating a process of TTI reconfiguration in a UE according to an exemplary embodiment of the present invention.

FIG. 6 is a flow diagram illustrating a process of TTI reconfiguration in a UE according to an exemplary embodiment of the present invention. Referring to FIG. 6, if receiving a TTI reconfiguration message from a Node B in step 600, the UE stops a HARQ process in step 602, reconfigures a new TTI using the received TTI reconfiguration message in step 604, ignores an ACK/NACK signal transmitted by a previous TTI in step 606, and initiates data transmission by the new TTI in step 608.

As described above, an exemplary embodiment of the present invention can minimize a loss of data upon TTI reconfiguration and perform HARQ retransmission, and shorten a delay time caused by the HARQ retransmission, by including an ACK/NACK determiner, an ACK/NACK controller, and a TTI controller. The ACK/NACK determiner determines if a response signal to be transmitted according to an error or non-error of data received from a UE is ACK or NACK. The ACK/NACK controller counts the ACK and NACK determined in the ACK/NACK determiner. If detecting occurrence of a TTI reconfiguration event, the TTI controller identifies if number of the latest ACKs counted in the ACK/NACK controller is continuously generated by preset number of times and, if the number of the latest ACKs is continuously generated by the preset number of times, reconfigure a new TTI. That is, an exemplary embodiment of the present invention has an effect of increasing the efficiency of HARQ, thus increasing the efficiency of data transmission.

While the invention has been shown and described with reference to exemplary embodiments thereof, it will be understood by those skilled in the art that various changes in form and details may be made therein without departing from the spirit and scope of the invention as defined by the appended claims and their equivalents.

The invention claimed is:

1. A Node B for Transmission Time Interval (TTI) reconfiguration in a mobile communication system, the Node B comprising:
   an ACK/NACK determiner configured to determine if a response signal to be transmitted is ACKnowledgment (ACK) or Non ACKnowledgment (NACK) depending on an error or non-error of data received from a User Equipment (UE);
   an ACK/NACK controller configured to count the number of ACK and NACK determined in the ACK/NACK determiner; and
   a TTI controller configured to reconfigure a new TTI if the number of latest ACKs counted in the ACK/NACK controller are continuously generated as many as a preset number of times.

2. The Node B of claim 1, wherein, if the latest ACKs are not continuously generated as many as the preset number of times, the TTI controller waits for the TTI reconfiguration until the number of ACKs continuously generated is equal to the preset number of times.

3. The Node B of claim 1, further comprising:
   a power controller configured to generate and send a power boosting message if the number of NACKs counted in the ACK/NACK controller is generated more than a predetermined number of times during a preset interval.

4. The Node B of claim 3, wherein the power boosting message is a message of re-questing a high transmission power output during a set time and comprises a start time point and cycle information expressed by Connection Frame Number (CFN).

5. A User Equipment (UE) for Transmission Time Interval (TTI) reconfiguration in a mobile communication system, the UE comprises:
   a power controller configured to, upon receiving a power boosting message, identify boosting cycle information comprised in the power boosting message, and provide the identified cycle information to a gain controller; and
   the gain controller for configured to increase, by power boosting, a gain of output data during the boosting cycle received from the power controller.

6. The UE of claim 5, wherein the power boosting message is a message of re-questing a high transmission power output during a set time and comprises a start time point and cycle information expressed by Connection Frame Number (CFN) that is the boosting information.

7. The UE of claim 5, further comprising:
   a TTI controller for, upon receiving a TTI reconfiguration message from a Node B, stopping Hybrid Automatic Repeat reQuest (HARQ) process and reconfiguring a new TTI using the received TTI reconfiguration message.

8. The UE of claim 7, wherein the power controller controls the gain controller to stop the power boosting if the TTI controller receives the TTI reconfiguration message during the boosting cycle.

9. A method for Transmission Time Interval (TTI) reconfiguration in a Node B of a mobile communication system, the method comprising:

determining if a response signal to be transmitted is ACKnowledgment (ACK) or Non ACKnowledgment (NACK) depending on an error or non-error of data received from a User Equipment (UE);

counting the number of determined ACK and NACK; and if the latest number of ACKs are continuously generated as many as a preset number of times, reconfiguring a new TTI.

10. The method of claim 9, wherein, if the latest ACKs are not continuously generated as many as the preset number of times, the TTI controller waits for the TTI reconfiguration until the number of ACKs continuously generated is equal to the preset number of times.

11. The method of claim 9, further comprising:

a power controller configured to generate and send a power boosting message if the number of NACKs counted in the ACK/NACK controller is generated more than a predetermined number of times during a preset interval.

12. The method of claim 11, wherein the power boosting message is a message of re-questing a high transmission power output during a set time and comprises a start time point and cycle information expressed by Connection Frame Number (CFN).

13. A method for Transmission Time Interval (TTI) reconfiguration in a User Equipment (UE) of a mobile communication system, the method comprises:

upon receiving a power boosting message, identifying boosting cycle information comprised in the power boosting message; and increasing, by power boosting, a gain of output data during the boosting cycle.

14. The method of claim 13, wherein the power boosting message is a message of re-questing a high transmission power output during a set time and comprises a start time point and cycle information expressed by Connection Frame Number (CFN) that is the boosting information.

15. The method of claim 13, further comprising:

upon receiving a TTI reconfiguration message from a Node B, stopping Hybrid Automatic Repeat reQuest (HARQ) process; and reconfiguring a new TTI using the received TTI reconfiguration message.

16. The method of claim 15, further comprising:

after the reconfiguring of the new TTI, ignoring an ACK or NACK signal transmitted by a previous TTI.

17. The method of claim 15, further comprising:

stopping the power boosting if the TTI reconfiguration message is received during the boosting cycle.

\* \* \* \* \*